US012657179B2

(12) United States Patent
Alberti et al.

(10) Patent No.: US 12,657,179 B2
(45) Date of Patent: Jun. 16, 2026

(54) METADATA ON DELTA SHARING TABLES

(71) Applicant: SAP SE, Walldorf (DE)

(72) Inventors: Johannes Alberti, Walnut Creek, CA (US); Rubens Luiz Rech, Jr., Rio Grande do Sul (BR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/944,743

(22) Filed: Nov. 12, 2024

(65) Prior Publication Data

US 2026/0099482 A1    Apr. 9, 2026

Related U.S. Application Data

(60) Provisional application No. 63/703,519, filed on Oct. 4, 2024.

(51) Int. Cl.
  *G06F 16/00*      (2019.01)
  *G06F 16/22*      (2019.01)
  *G06F 16/23*      (2019.01)
  *G06F 16/242*     (2019.01)
(52) U.S. Cl.
  CPC ...... *G06F 16/2322* (2019.01); *G06F 16/2282* (2019.01); *G06F 16/244* (2019.01)
(58) Field of Classification Search
  CPC . G06F 16/2322; G06F 16/2282; G06F 16/244
  See application file for complete search history.

(56) References Cited

U.S. PATENT DOCUMENTS

| | | | | |
|---|---|---|---|---|
| 5,481,722 | A * | 1/1996 | Skinner | G06F 8/71 |
| | | | | 717/122 |
| 2018/0095952 | A1* | 4/2018 | Rehal | G06F 16/907 |
| 2018/0096001 | A1 | 4/2018 | Soza | |
| 2021/0374146 | A1* | 12/2021 | Hrastnik | G06F 16/24573 |
| 2022/0012241 | A1 | 1/2022 | Colcord et al. | |
| 2022/0253424 | A1* | 8/2022 | Armbrust | G06F 16/2358 |
| 2025/0130992 | A1* | 4/2025 | Ma | G06F 16/2448 |

OTHER PUBLICATIONS

"European Application Serial No. 25206396.1, Extended European Search Report mailed Feb. 13, 2026", 12 pgs.
Armbrust, Michael, "Delta Lake High-Performance ACID Table Storage over Cloud Object Stores", Proceedings of the VLDB Endowment PVLDB, vol. 13, No. 12, 2020, 3411-3424.

* cited by examiner

*Primary Examiner* — Alex Gofman
*Assistant Examiner* — Suman Rajaputra
(74) *Attorney, Agent, or Firm* — SCHWEGMAN LUNDBERG & WOESSNER, P.A.

(57)     ABSTRACT

In an example embodiment, additional metadata is attached to a delta tables, via delta shares, in the form of a common schema notation (CSN) entity. When a request is received from a client for a share of a range of delta tables where the range comprises the delta table to which the additional metadata is attached, the most recent CSN entity for each of the delta tables in the range are aggregated and returned to the client.

20 Claims, 5 Drawing Sheets

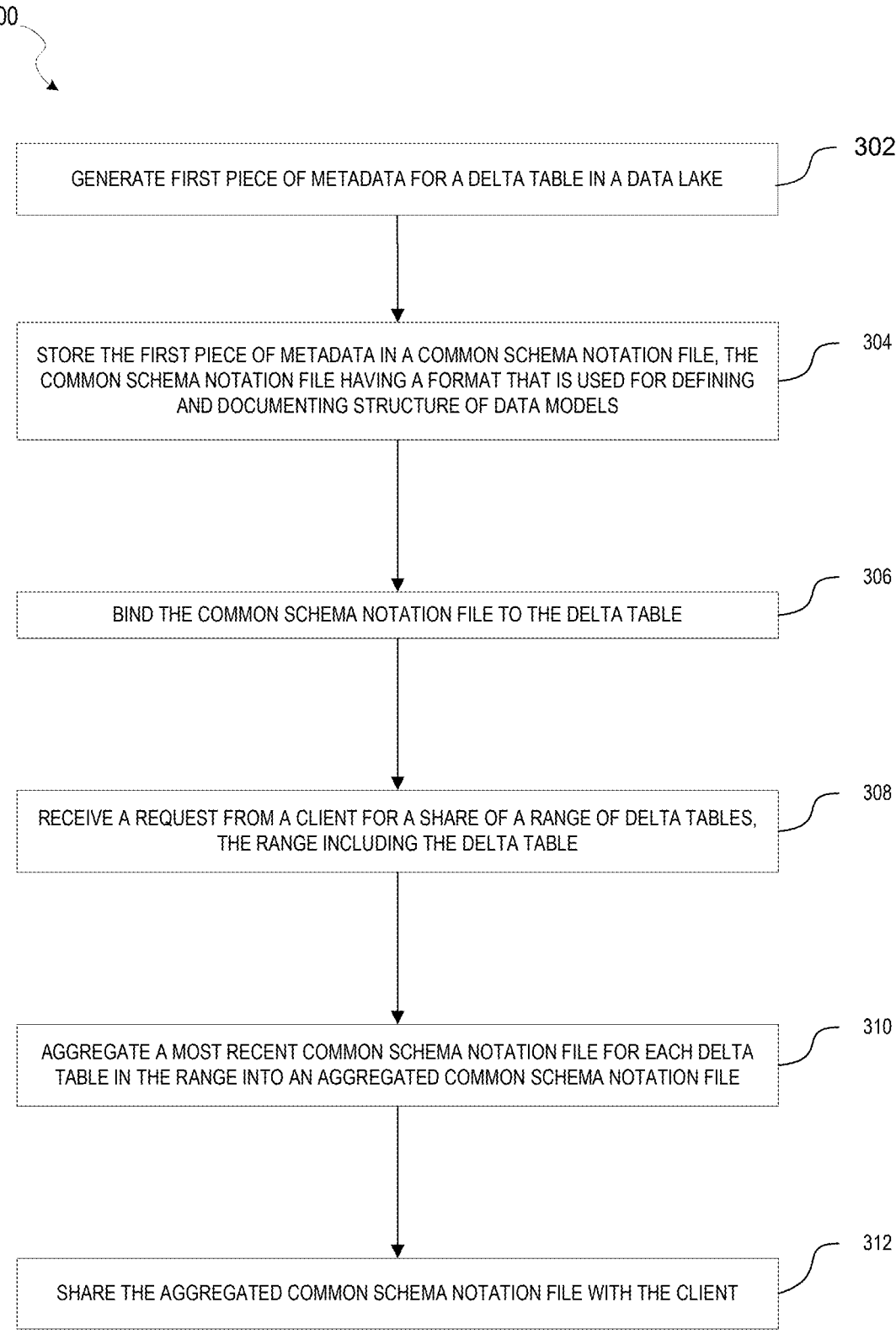

300

GENERATE FIRST PIECE OF METADATA FOR A DELTA TABLE IN A DATA LAKE ⟋ 302

STORE THE FIRST PIECE OF METADATA IN A COMMON SCHEMA NOTATION FILE, THE COMMON SCHEMA NOTATION FILE HAVING A FORMAT THAT IS USED FOR DEFINING AND DOCUMENTING STRUCTURE OF DATA MODELS ⟋ 304

BIND THE COMMON SCHEMA NOTATION FILE TO THE DELTA TABLE ⟋ 306

RECEIVE A REQUEST FROM A CLIENT FOR A SHARE OF A RANGE OF DELTA TABLES, THE RANGE INCLUDING THE DELTA TABLE ⟋ 308

AGGREGATE A MOST RECENT COMMON SCHEMA NOTATION FILE FOR EACH DELTA TABLE IN THE RANGE INTO AN AGGREGATED COMMON SCHEMA NOTATION FILE ⟋ 310

SHARE THE AGGREGATED COMMON SCHEMA NOTATION FILE WITH THE CLIENT ⟋ 312

*FIG. 3*

METADATA ON DELTA SHARING TABLES

CROSS-REFERENCE TO RELATED APPLICATIONS

This application claims the benefit of U.S. Provisional Application No. 63/703,519, filed Oct. 4, 2024, entitled "METADATA ON DELTA SHARING TABLES," which is incorporated herein by reference in its entirety.

BACKGROUND

A data lake is a single, centralized repository where an organization can store data in structured, unstructured, and semi-structured format. This allows an organization to more quickly and easily store, access, and analyze a wide variety of data in a single location. Unlike a database, data stored in a data lake does not need to fit into a specific structural format. Instead, data can be stored in its raw or native format, usually as files or binary large objects (BLOBS).

BRIEF DESCRIPTION OF DRAWINGS

The present disclosure is illustrated by way of example and not limitation in the figures of the accompanying drawings, in which like references indicate similar elements.

FIG. 3 is a flow diagram illustrating a method for attaching metadata to a delta table, in accordance with an example embodiment.

DETAILED DESCRIPTION

Figure 1:
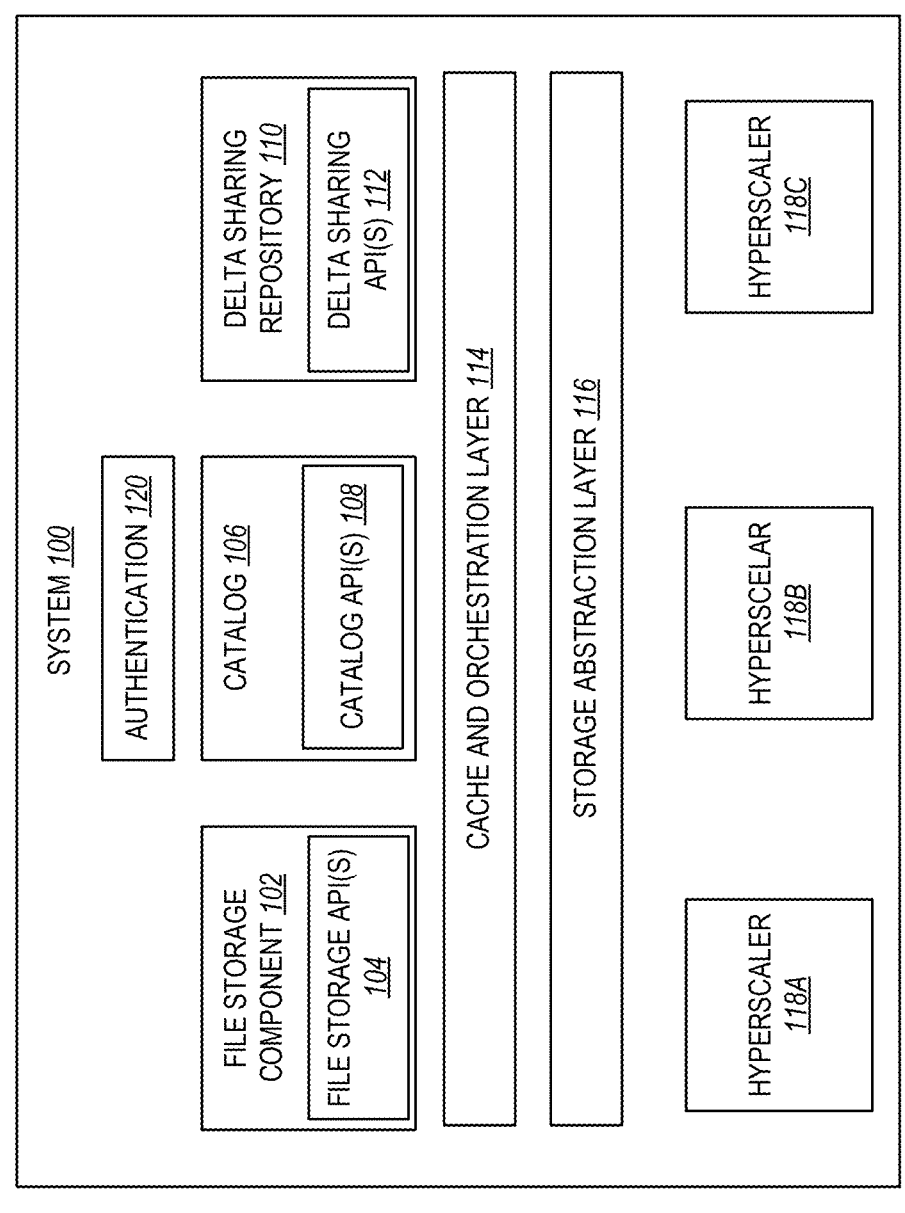
FIG. 1 is a block diagram illustrating a system for HDL file management, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

A technical issue is encountered with the use of data lakes, and specifically with respect to the use of delta tables. A delta table works by combining elements of data lakes and data warehouses to provide a more reliable solution for data processing than data lakes alone. Specifically, delta tables are stored in a specialized format that is built on top of existing data storage system. It adds additional metadata and transaction logs to the data lake files.

The transaction log records all changes (e.g., writes, updates, deletes) made to the delta table, which helps ensure that all operations are completed successfully or rolled back if there is an issue, and also allows for querying of historical versions of the data and to manage concurrent reads and rights.

Delta tables can also support a delta sharing protocol that enables secure sharing of delta tables.

Nevertheless, the metadata model of delta sharing and delta tables does not cover all relevant metadata. It is missing items such as strong table schema definition, primary key specification, relationships between tables, i18next for metadata, and business semantics. All of these items are useful for downstream processing in a cloud storage environment. These downstream processing tasks may involve, for example, use of data in machine learning models, either in the training of those machine learning models or in the use of the machine learning models to make predictions (or both).

Changing the metadata model to include such additional items is not feasible, and as such an alternative solution is needed to address the lack of strong table schema definition, primary key specification, relationships between tables, i18 next for metadata, and business semantics in the delta table metadata.

In an example embodiment, the additional metadata is attached to delta tables, via delta shares, in the form of a common schema notation (CSN) entity. CSN is a standard format used primarily in the context of Core Data Services (CDS) for defining and documenting the structure of data models. CDS is a framework used to define database schemas, and CSN is a way to represent these schemas in a standardized, machine-readable format.

Data lake files can sometime be stored in an in-memory data store, such as HANA™ from SAP of Walldorf, Germany. Data lake files are therefore sometimes known as HANA Data Lake (HDL) files.

HDL files can then expose aggregated CSN metadata for discovery of delta shares and delta tables with rich semantics from within a unified customer landscape (URL) through, for example, a discovery protocol such as the Open Resource Discovery (ORD) protocol.

Since the delta tables themselves provide for versioning of schemas/data as well as schema evolution, in an example embodiment this versioning and evolution are extended to the CSN metadata definition. When providing the CSN document for a table, users are therefore allowed to specify the starting delta table version from which the CSN document is valid. This applies to all table versions until a new update to the same table provides a different CSN entity for a higher version of the delta table. Thus, for example, consider the following table:

| CSN Version | Valid for Delta table version |
|---|---|
| 0 | 0 |
| 1 | 23 |
| 2 | 45 |

This example represents the scenario in which a table has three CSN documents attached to it: 0, 1, and 2, and they apply to the following table version ranges respectively: 0-22, 23-44, and 45-.

FIG. 1 is a block diagram illustrating a system 100 for HDL file management, in accordance with an example embodiment. A file storage component 102 stores the HDL files themselves. The file storage component 102 may be in the form of, for example, a Web Hadoop Distributed File System (WebHDFS) repository or database. WebHDFS is a Representational State Transfer (REST) application program interface (API) for accessing HDFS files. It provides a web-based interface to interact with HDFS, allowing for file storage and retrieval operations over Hypertext Transfer Protocol (HTTP). The file storage component 102 may therefore have one or more file storage APIs 104, such as a WebHDFS, that can be used to access, upload, download, and manage the files stored in the file storage component 102.

A catalog 106 manages metadata relating to the HDL files, such as table definitions, schema information, and file attributes. This helps in organizing and querying metadata efficiently. The catalog 106 includes tables that describe the structure, relationships, and attributes of the HDL files. Querying and management of this metadata can be performed using one or more catalog APIs 108.

A delta sharing repository 110 stores information about delta shares. Delta sharing involves sharing incremental changes (deltas) between different versions of Delta tables in HDL files. The delta sharing repository 110 tracks these changes and facilitates efficient sharing. This may involve storing delta files or logs that capture modifications, additions, or deletions occurring between different versions of HDL files. The delta sharing repository 110 has one or more delta sharing APIs 112 to perform these tasks.

A cache and orchestration layer 114 manages interactions with the system 100 and the one or more file storage APIs 104, the one or more catalog APIs 108, and the one or more delta sharing APIs 112. More specifically it can cache frequently accessed HDL files, metadata, and delta tables and handles workflows, process automation, and ensures that data flows smoothly between the file storage component 102, the catalog 106, and the delta sharing repository 110.

A storage abstraction layer 116 offers a consistent API for interacting with different types of storage systems and hides the details of where and how the data is stored, allowing applications to interact with data in a uniform way regardless of the underlying storage technology. Thus, for example, external hyperscalers 118A, 118B, 118C can interact with the file storage component 102, the catalog 106, and the delta share repository 110 without knowing the details of how those components operate. The storage abstraction layer 116 abstracts the one or more file storage APIs 104, the one or more catalog APIs 108, and the one or more delta sharing APIs 112.

An authentication component 120 ensures that only authorized users and systems can access and modify the HDL files or metadata.

In an example embodiment, the one or more file storage APIs 104, the one or more catalog APIs 108, and the one or more delta sharing APIs 112 are modified to accommodate the use of CSN entities as additional metadata by providing the ability to binds CSN models to existing delta share tables.

Figure 2:
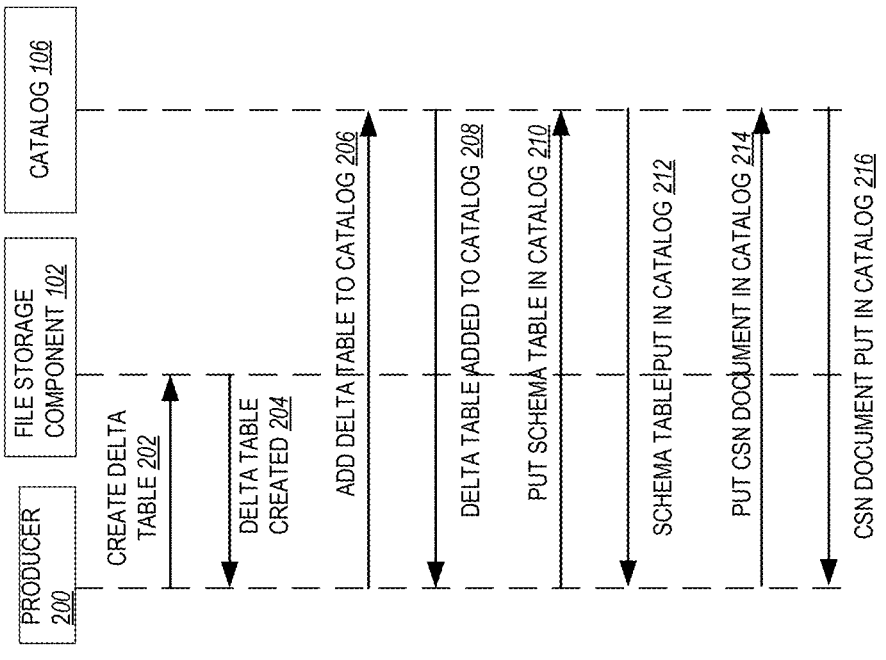
FIG. 2 is a sequence diagram illustrating the binding of CSN models to delta share tables, in accordance with an example embodiment.

Specifically, new endpoints can be introduced in the catalog 106 to allow users to bind CSN models to existing delta share tables. This means users create the share table in the catalog and then attach the CSN metadata with a subsequent request to the share table's CSN endpoint. FIG. 2 is a sequence diagram illustrating the binding of CSN models to delta share tables, in accordance with an example embodiment. Specifically, a producer 200 creates a delta table in the file storage component 102 at operation 202, and at operation 204 a notification is generated indicating that the delta table has been created. The delta table is then added to the catalog 106 at operation 206, with a notification generated at operation 208 indicating that the delta table has been added to the catalog 106.

At operation 210, the producer 200 puts a schema table in the catalog 106, and at operation 212 a notification is generated indicating that the schema table has been created in the catalog 106. At operation 214, the producer 200 puts a CSN document into the catalog 106, and at operation 216 a notification is generated indicating that the CSN document has been created and bound to the delta table.

To create a new CSN document for a given table (<share>, <schema>, <table>), a specified endpoint should be requested. For example:

| Request attribute | Value |
| --- | --- |
| Method | PUT |
| URL Path | /catalog/v2/shares/<share>/schemas/<schema>/tables/<table>/csn |
| Header | X-SAP-Delta-Sharing-CSN-Table-Start-Version: <delta-table-version> |
| API ID | Create Share Table CSN |

In this example, the X-SAP-Delta-Sharing-CSN-Table-Start-Version header is optional and may be provided to indicate the version of the Delta table from which the CSN document is valid. In case no starting version is provided, the CSN document will be considered the default for that table and will apply to any version of the table, until a new "versioned" CSN document is created for the table.

The request payload can describe the table schema in the form of a valid CSN document, but the file storage component 102 will neither enforce that the schema definition matches the actual table schema nor validate whether the JSON document follows the CSN notation specification. The table schema definition in the form of CSN documents is the responsibility of the data producers.

The API endpoint, in an example embodiment, may enforce that:
1. The request payload is a valid JavaScript Object Notation (JSON) document
2. There is a definitions dictionary in the first-level JSON object; and
3. The definitions dictionary has a record whose key is exactly the share table name or $self and the value is a JSON object Users can retrieve CSN metadata with a corresponding GET API endpoint, such as:

| Request attribute | Value |
| --- | --- |
| Method | GET |
| URL Path | /catalog/v2/shares/<share>/schemas/<schema>/tables/<table>/csn? [includeVersions = [true\|false]] |

-continued

| Request attribute | Value |
|---|---|
| Header | X-SAP-Delta-Sharing-CSN-Table-Version: <delta-table-version> |
| API ID | Get Share Table CSN |

The header X-SAP-Delta-Sharing-CSN-Table-Version is optional and may be used to request the CSN document for a specific version of the Delta table. If not provided, the default CSN document of the table will be returned. In case the table has no default CSN document attached and the header is not provided, the request can fail and responded with 404 Not Found. As a special value for this header, −1 indicates the CSN corresponding to the highest starting table version should be returned.

To get all versions of the CSN entities, the parameter include Versions=true can be provided. The response will be the default CSN document (if available) with an extra annotation field @DeltaSharing.csn Versions, under the table's entity object, whose value is a JSON object that maps each Delta table starting version to the corresponding CSN. Example:

```
{
    "definitions": {
        "MyShareTable": {
            "kind": "entity",
            "elements": {
                "id": {
                    "key": true,
                    "type": "cds.UUID",
                    "notNull": true
                },
                "name": {
                    "type": "cds.String"
                }
            },
            "@DeltaSharing.csnVersions": {
                "0": {
                    "definitions": {
                        "MyShareTable": {
                            "kind": "entity",
                            "elements": {
                                "id": {
                                    "key": true,
                                    "type": "cds.UUID",
                                    "notNull": true
                                },
                                "name": {
                                    "type": "cds.String",
                                    "length": 50
                                }
                            }
                        }
                    }
                },
                "8": {
                    "definitions": {
                        "MyShareTable": {
                            "kind": "entity",
                            "elements": {
                                "id": {
                                    "key": true,
                                    "type": "cds.UUID",
                                    "notNull": true
                                },
                                "name": {
                                    "type": "cds.String",
                                    "length": 50
                                },
                                "price": {
```

-continued

```
                                    "type": "cds.Decimal",
                                    "precision": 16,
                                    "scale": 3
                                }
                            }
                        }
                    },
                    ...
                }
            }
        }
    }
}
```

The parameter include Versions and X-SAP-Delta-Sharing-CSN-Table-Version are mutually exclusive. i.e., they cannot be used in conjunction. If the table has no default CSN associated to it, the response will not contain the elements object under the table's entity object.

```
{
    "definitions": {
        "MyShareTable": {
            "kind": "entity",
            "@DeltaSharing.csnVersions": {
                "0": {
                    "definitions": {
                        "MyShareTable": {
                            "kind": "entity",
                            "elements": {
                                "id": {
                                    "key": true,
                                    "type": "cds.UUID",
                                    "notNull": true
                                },
                                ...
                            }
                        }
                    },
                    ...
                }
            }
        }
    }
}
```

Analogously to the PUT API, a DELETE API can be used to de-associate and remove entities for a specific table. For example:

| Request attribute | Value |
|---|---|
| Method | DELETE |
| URL Path | /catalog/v2/shares/<share>/schemas/<schema>/tables/<table>/csn |
| Header | X-SAP-Delta-Sharing-CSN-Table-Start-Version: <delta-table-version> |
| API ID | DELETE Share Table CSN |

The X-SAP-Delta-Sharing-CSN-Table-Start-Version header is optional and, if not provided, the default CSN will be deleted. Otherwise, the CSN associated with the starting version will be removed.

In order to enable delta sharing clients to consume share tables with managed metadata, the delta sharing APIs can be enhanced to optionally return CSN metadata in responses. More specifically, Query Table Metadata, Read Data from Table, and Read Change Data Feed from Table APIs can include an additional field as part of the metadata object in the response. CSN may be included if any of the following conditions are met:

1. It is indicated in the request that this is a delta sharing client through the header.
2. The respective share, in the catalog 106, is marked with a publishCSN: true attribute.

As an example, the request and response for the Query Table Metadata operation including CSN table metadata would look like the following:

```
Request:
GET https://<instance-
fqdn>/sharing/v1/shares/{share}/schemas/{schema}/tables/MyShareTable/metadata
OR
GET https://<instance-
fqdn>/sharing/v1/shares/{share}/schemas/{schema}/tables/MyShareTable/metadata
Response:
{
  "protocol": {
    "minReaderVersion": 1
  }
}
{
  "metaData": {
    "id": "f8d5c169-3d01-4ca3-ad9e-7dc3355aedb2",
    "format": {
      "provider": "parquet"
    },
    "schemaString": "{\"type\":\"struct\",\"fields\":[{\"name\":\"id\",\"type\":\"long\"}"
    "partitionColumns": [
      "date"
    ],
    "@sap/delta-sharing/csn": {
      "definitions": {
        "MyShareTable": {
          "kind": "entity",
          "elements": {
            "id": {
              "key": true,
              "type": "cds.UUID",
              "notNull": true
            },
            "name": {
              "type": "cds.String"
            },
            "age": {
              "type": "cds.Integer",
              "notNull": true
            }
          }
        }
      }
    }
  }
}
``` document for description and discovery of delta shares, with enhanced and rich semantics from within a Unified Customer Landscape (UCL).

| Request attribute | Value |
|---|---|
| Method | GET |
| URL Path | /sharing/v1/shares/<share>/csn and /catalog/v2/shares/<share>/csn |
| API ID | Get Share CSN |

The response may look like:

```
  }
  "definitions": {
    "Transportation": {
      "kind": "context"
```

In order to enable users to get a consolidated view of the CSN metadata for a share, a new Get Share CSN API can be introduced to the catalog 106 and its response will contain a unified CSN document aggregating the CSN entities of all tables within the share.

In an example embodiment, the API endpoint URL can be referenced in the API Resource Definition of an ORD -continued

```
    },
    "Accomodation": {
      "kind": "context"
    },
    "Transportation.Flight": {
      "kind": "entity",
```

-continued

```
            "elements": {
                ...
            }
        },
        "Transportation.TrainStation": {
            "kind": "entity",
            "elements": {
                ...
            }
        },
        "Accomodation.Hotel": {
            "kind": "entity",
            "elements": {
                ...
            }
        }
    }
}
```

In general, the aggregated CSN of a share represents a deep JSON merge of the latest CSN document of all tables within that share. However, to avoid conflicts between tables with the same name within different schemas, table definition names may be qualified with the name of the schema to which they belong. Each schema must have its own definition record of kind context.

Note that, when the entity name in any of the CSN documents of the tables being aggregated is $self, the variable will be resolved to the qualified identifier of the share table. Besides that, it may not be sufficient to replace and qualify only the table definition names, and thus it may also adapt the association targets.

This pattern is also extensible for CSN documents that could aggregate entities from multiple shares. In that scenario, the qualified entity names in the aggregated CSN document may contain multiple namespace levels. Shares being the highest-level entities, they should be defined as services, which are essentially represented by "context" sections of kind "service". For example:

```
{
    "definitions": {
        "Share1": {
            "kind": "service",
            "@DeltaSharing.entity": "share"
        },
        "Share2": {
            "kind": "service",
            "@DeltaSharing.entity": "share"
        },
        "Share1.Schema1": {
            "kind": "context",
            "@DeltaSharing.entity": "schema"
        },
        "Share2.Schema1": {
            "kind": "context",
            "@DeltaSharing.entity": "schema"
        },
        "Share1.Schema1.Table1": {
            "kind": "entity",
            "elements": { ... }
        },
        "Share2.Schema1.Table1": {
            "kind": "entity",
            "elements": { ... }
        },
        ...
    }
}
```

For performance reasons, the consolidation of the aggregated CSN for the share should not happen on requests to the Get Share CSN API, but rather during write/delete operations that alter the state of the share's CSN metadata. This should reduce I/O and compute since Get Share CSN is expected to be called more frequently than write/delete operations.

During the attachment or deletion of a CSN document to/from any table of the share with the Create Share Table CSN or Delete Share Table CSN API or during the deletion of a share table with the Delete Share Table API, HDL Files will asynchronously trigger the consolidation of the aggregated CSN document which will be eventually consistent. It should be possible to do batch processing so that accumulated events/changes in the queue can be aggregated in a single task. Besides that, HDL Files should also keep supporting concurrent writers for different tables of a share.

To prevent scenarios where async aggregation tasks are lost by the IMDG, resulting in the share CSN becoming inconsistent/outdated forever, it is necessary to "persist" the fact that the share CSN document is dirty/outdated. This will be done by storing an aggregation event marker. Later on, the async task will perform the aggregation, consolidate the result into a share CSN file, and clean the event markers.

The following algorithm summarizes what should happen when HDL Files receives a request for any of these operations: Create/Update Share Table CSN, Delete Share Table or Delete Share Table CSN.

1. Persist an Aggregation Event Marker

The aggregation event marker is basically an empty file whose name should contain the "event" timestamp and should be stored under the share metadata prefix: . . . /<share-oid>/@@csn/aggregate-event-<timestamp>. Check the Persistence section for more details.

2. Process the Request Operation

That is, store the provided CSN for the share table in case of Create/Update Share Table CSN, delete the share table CSN in case of Delete Share Table CSN or delete the share table in case of Delete Share Table.

3. Submit Async Aggregation of the Share CSN

Leveraging a distributed executor, the aggregation task should be submitted to the node owning the share (i.e., the IMDG node that holds the data partition containing the share key). Aggregation tasks for the same share should be synchronized.

The task should start by checking whether there are existing aggregate event markers, otherwise, quit the execution since there is nothing to be done, as the aggregation may have already been covered/processed by the previous tasks (batch event processing).

The resulting aggregated CSN document, along with the timestamp of when the task started, should be stored in a dedicated file under the share metadata directory ( . . . /<share-oid>/@@csn.json). After storing the CSN, the obsolete event markers can be deleted, i.e., all event markers created before the aggregation task start to be executed. Note that this can be checked based on the timestamp which is part of the marker file names.

Considering the aggregation happens during write operations and is stored in a file, the Get Share CSN API can simply retrieve the share CSN from this file.

In order to be able to recover from scenarios where aggregation tasks were lost and there are un-processed aggregation event markers, a new async task can be submitted in case the last aggregation time (persisted along with the aggregated CSN document) is too old.

As for persistence of metadata for CSN entities, the following file structure represents one way that metadata can be persisted for shares and share tables by the catalog 106:

```
shares-metadata/
├─{my-share-1}.json
├─<my-share-1-oid>/
├─@@csn.json
├─@@csn/
││├─agg-event-marker-1717529943346
│││_agg-event-marker-1717529974342
││_{my-schema-1}/
│  │_{my-table-1 }.json
├─{my-share-2}.json
│_<my-share-2-oid>/
    │_my-schema-2}/
       │_{my-table-2} .json
```

The aggregated CSN of a share can be stored in its dedicated JSON file under the share metadata prefix. It should contain not only the aggregated CSN document but also the last aggregation timestamp, so that operations to recover the consistency of the share CSN can happen periodically in case the current state is considered too old.

```
{
    "shareCsn": <share-agg-csn>,
    "lastAggregationTime": <timestamp>
}
```

The aggregation event markers should be kept under a dedicated directory (@@csn) also under the share metadata prefix.

CSN metadata of share tables will be stored along with the already existing table metadata in the respective share table JSON file. An additional field, called csnEntities, will be introduced and will contain the content of the CSN documents. The table's default CSN document (if any) will be kept under the default sub-field, while CSNs that are created targeting a specific table version will be kept separately under a versions map whose key indicates the table starting version for the corresponding CSN. The following example illustrates the contents of the metadata JSON file for a share table that contains a default CSN document and three versioned CSN documents.

```
{
    "location":
    "hdlfs://fe3bd16d-0d10-4695-abba-93d724673d64.files.hdl.prod-
        us30.hanaclou
    "partitions": [
        {
            "name": "date",
            "op": "EQUAL",
            "value": "2021-04-29T00:00:00.000Z"
        }
    ],
    "csnEntities": {
        "default": <default-csn-doc>,
        "versions": {
            "0": <csn-doc-valid-from-delta-table-version-0>,
            "5": <csn-doc-valid-from-delta-table-version-5>,
            "12": <csn-doc-valid-from-delta-table-version-12>
        }
    }
}
```

The first versioned CSN, whose key is 0, would be valid for table versions between 0 and 4. The second versioned CSN, whose key is 5, would be valid for table versions between 5 and 11. The last version CSN, whose key is 12, would be valid for any table version>=12.

Storing the CSN documents into the share table file avoids the need for extra storage operations, which is desirable for performance reasons. If each CSN were stored in a separate file, for example, it would be necessary to list the prefix containing the CSN files to identify the one that best matches the user request.

Because CSN metadata only describes the table schema structure, each document tends to contain data on the order of a few kilobytes. So this should not cause scalability problems, in the sense that the share table file will not contain extremely large amounts of data.

A caching layer can be introduced to keep metadata of shares and share tables in memory and allow faster queries and also reduce the amount of storage operations.

In a further example embodiment, access control may be provided for the CSN metadata separately from the underlying delta tables. This allows, for example, a client to be granted permission to CSN metadata associated with a delta table without being granted permission to the delta table itself, and vice-versa.

FIG. 3 is a flow diagram illustrating a method 300 for attaching metadata to a delta table, in accordance with an example embodiment. At operation 302 a first piece of metadata for a delta table in a data lake is generated. The data lake is a storage containing structured, unstructured, and semi-structured data. The delta table describes differences among multiple versions of a data like file stored in the data lake. The first piece of metadata is of a first metadata type that is not supported by a format of the delta table.

At operation 304, the first piece of metadata is stored in a common schema notation file. The common schema notation file has a format that is used for defining and documenting structure of data models. At operation 306, the common schema notation file is bound to the delta table.

At operation 308, a request is received from a client for a share of a range of delta tables, the range including the delta table.

At operation 310, a most recent common schema notation file for each delta table in the range are aggregated into an aggregated common schema notation file. At operation 312, the aggregated common schema notation file is shared with the client.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1 is a system comprising: at least one hardware processor; and a computer-readable medium storing instructions that, when executed by the at least one hardware processor, cause the at least one hardware processor to perform operations comprising: generating a first piece of metadata for a delta table in a data lake, the data lake being a storage containing structured, unstructured, and semi-structured data, the delta table describing differences among multiple versions of a data like file stored in the data lake, the first piece of metadata being of a first metadata type that is not supported by a format of the delta table; storing the first piece of metadata in a common schema notation file, the common schema notation file having a format that is used for defining and documenting structure of data models; binding the common schema notation file to the delta table; receiving a request from a client for a share of a range of delta tables, the range comprising the delta table; aggregating a most recent common schema notation file for each delta table in the range into an aggregated common schema notation file; and sharing the aggregated common schema notation file with the client.

In Example 2, the subject matter of Example 1 comprises, wherein the aggregated common schema notation file represents a JavaScript Object Notation (JSON) merge of the most recent common schema notation file for each delta table in the range.

In Example 3, the subject matter of Examples 1-2 comprises, wherein the aggregating is performed in response to a write or delete operation that alters a state of a common schema notation file in a delta table in the range.

In Example 4, the subject matter of Example 3 comprises, wherein the aggregating is triggered asynchronously.

In Example 5, the subject matter of Examples 1~4 comprises, wherein the aggregated common schema notation file contains an aggregation timestamp and wherein the operations further comprise recovering consistency of the aggregated common schema notation file using the aggregation timestamp.

In Example 6, the subject matter of Examples 1-5 comprises, wherein the first piece of metadata is used to train a machine learning model.

In Example 7, the subject matter of Examples 1-6 comprises, wherein the sharing is performed via a delta sharing application program interface (API).

Example 8 is a method comprising: generating a first piece of metadata for a delta table in a data lake, the data lake being a storage containing structured, unstructured, and semi-structured data, the delta table describing differences among multiple versions of a data like file stored in the data lake, the first piece of metadata being of a first metadata type that is not supported by a format of the delta table; storing the first piece of metadata in a common schema notation file, the common schema notation file having a format that is used for defining and documenting structure of data models; binding the common schema notation file to the delta table; receiving a request from a client for a share of a range of delta tables, the range comprising the delta table; aggregating a most recent common schema notation file for each delta table in the range into an aggregated common schema notation file; and sharing the aggregated common schema notation file with the client.

In Example 9, the subject matter of Example 8 comprises, wherein the aggregated common schema notation file represents a JavaScript Object Notation (JSON) merge of the most recent common schema notation file for each delta table in the range.

In Example 10, the subject matter of Examples 8-9 comprises, wherein the aggregating is performed in response to a write or delete operation that alters a state of a common schema notation file in a delta table in the range.

In Example 11, the subject matter of Example 10 comprises, wherein the aggregating is triggered asynchronously.

In Example 12, the subject matter of Examples 8-11 comprises, wherein the aggregated common schema notation file contains an aggregation timestamp and wherein the method further comprises recovering consistency of the aggregated common schema notation file using the aggregation timestamp.

In Example 13, the subject matter of Examples 8-12 comprises, wherein the first piece of metadata is used to train a machine learning model.

In Example 14, the subject matter of Examples 8-13 comprises, wherein the sharing is performed via a delta sharing application program interface (API).

Example 15 is a non-transitory machine-readable medium storing instructions which, when executed by one or more processors, cause the one or more processors to perform operations comprising: generating a first piece of metadata for a delta table in a data lake, the data lake being a storage containing structured, unstructured, and semi-structured data, the delta table describing differences among multiple versions of a data like file stored in the data lake, the first piece of metadata being of a first metadata type that is not supported by a format of the delta table; storing the first piece of metadata in a common schema notation file, the common schema notation file having a format that is used for defining and documenting structure of data models; binding the common schema notation file to the delta table; receiving a request from a client for a share of a range of delta tables, the range comprising the delta table; aggregating a most recent common schema notation file for each delta table in the range into an aggregated common schema notation file; and sharing the aggregated common schema notation file with the client.

In Example 16, the subject matter of Example 15 comprises, wherein the aggregated common schema notation file represents a JavaScript Object Notation (JSON) merge of the most recent common schema notation file for each delta table in the range.

In Example 17, the subject matter of Examples 15-16 comprises, wherein the aggregating is performed in response to a write or delete operation that alters a state of a common schema notation file in a delta table in the range.

In Example 18, the subject matter of Examples 11-17 comprises, wherein the aggregating is triggered asynchronously.

In Example 19, the subject matter of Examples 8-18 comprises, wherein the aggregated common schema notation file contains an aggregation timestamp and wherein the operations further comprise recovering consistency of the aggregated common schema notation file using the aggregation timestamp.

In Example 20, the subject matter of Examples 8-19 comprises, wherein the first piece of metadata is used to train a machine learning model.

Example 21 is at least one machine-readable medium comprising instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20. Example 24 is a method to implement of any of Examples 1-20.

Figure 4:
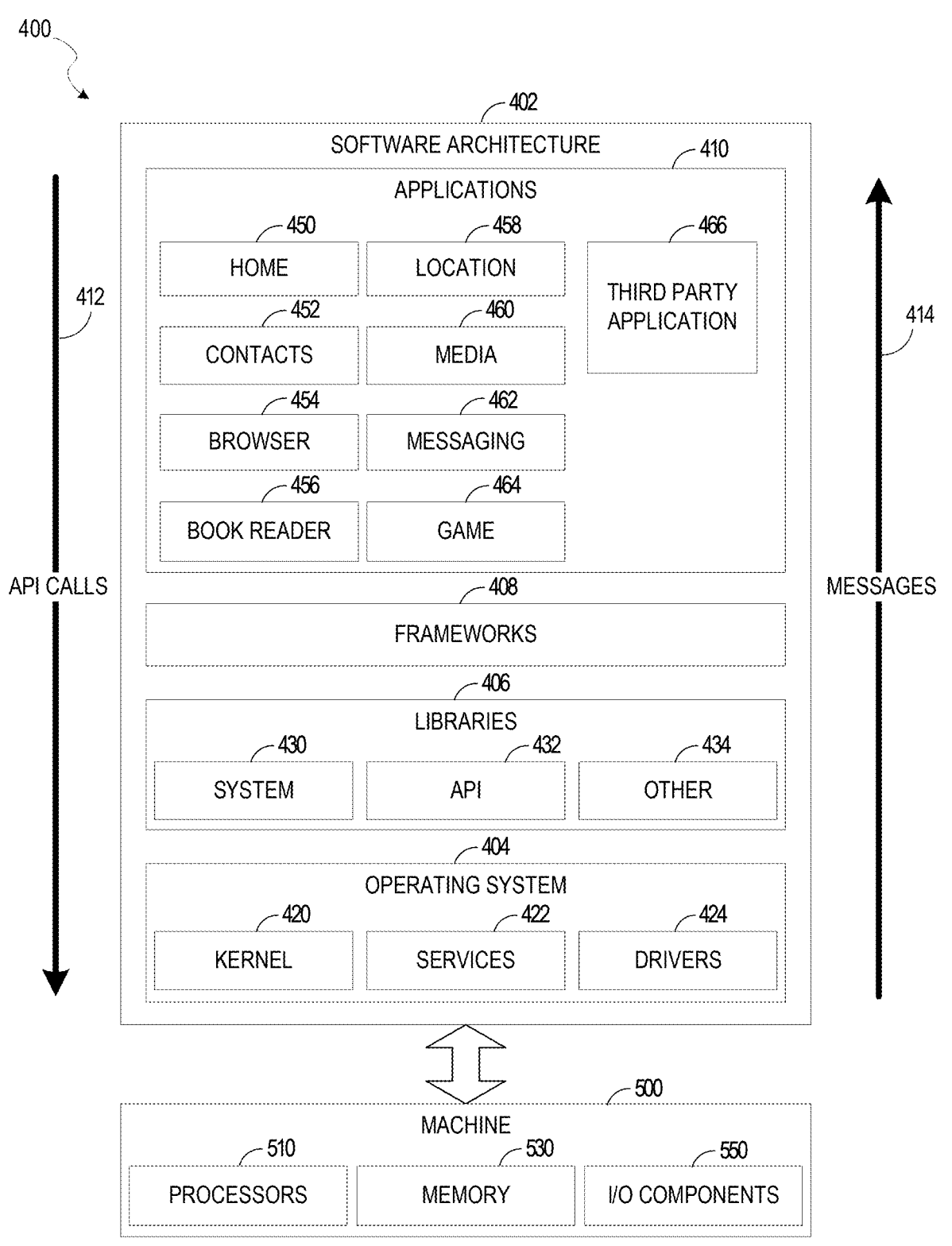
FIG. 4 is a block diagram illustrating a software architecture, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 of FIG. 4 can be conceptualized as a stack of layers where each layer may provide a particular functionality. For example, the software architecture 402 includes layers such as an operating system 404, libraries 406, frameworks 408, and applications 410. Operationally, the applications 410 invoke Application Program Interface (API) calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics [PNG]), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410. For example, the frameworks 408 provide various graphical user interface (GUI) functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. The applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 504 to facilitate functionality described herein.

Figure 5:
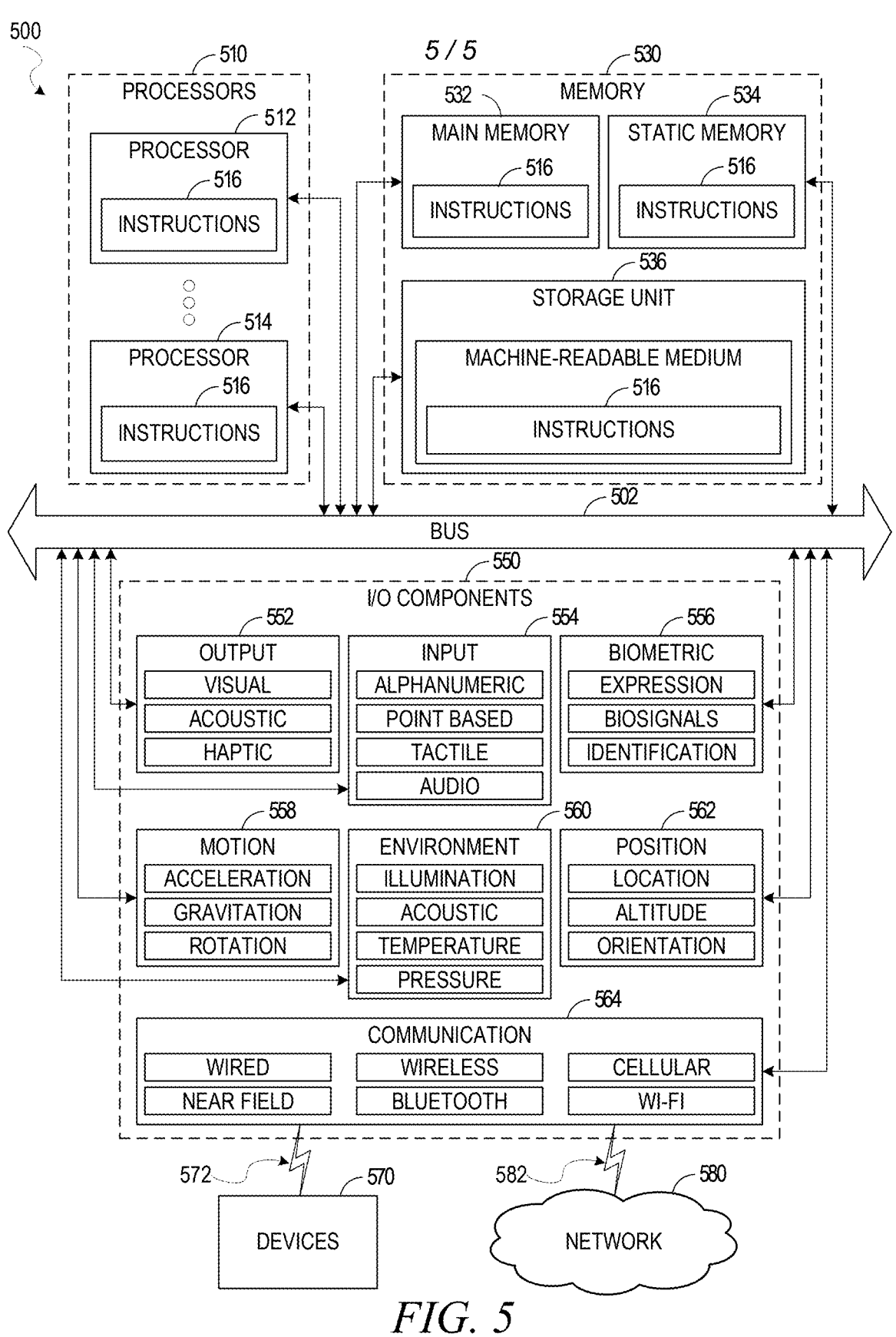
FIG. 5 illustrates a diagrammatic representation of a machine in the form of a computer system within which a set of instructions may be executed for causing the machine to perform any one or more of the methodologies discussed herein.

FIG. 5 illustrates a diagrammatic representation of a machine 500 in the form of a computer system within which a set of instructions may be executed for causing the machine 500 to perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube [CRT]), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (i.e., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically eras-able programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" spe-cifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technol-ogy, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoper-ability for Microwave Access (WiMAX), Long-Term Evo-lution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and uti-lizing any one of several well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclo-sure. The terms "transmission medium" and "signal medium" shall be taken to include any intangible medium that is capable of storing, encoding, or carrying the instruc-tions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-read-able medium," and "device-readable medium" mean the same thing and may be used interchangeably in this disclo-sure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations comprising:

generating a first piece of metadata for a delta table in a data lake, the data lake being a storage containing structured, unstructured, and semi-structured data, the delta table describing differences among multiple ver-sions of a data like file stored in the data lake, the first piece of metadata being of a first metadata type that is not supported by a format of the delta table;

storing the first piece of metadata in a common schema notation file, the common schema notation file having a format that is used for defining and documenting structure of data models;

binding the common schema notation file to the delta table, wherein the binding comprises attaching the common schema notation file to the delta table;

receiving a request from a client for a share of a range of delta tables, the range comprising the delta table;

aggregating a most recent common schema notation file for each delta table in the range into an aggregated common schema notation file separate and distinct from a delta table; and sharing the aggregated common schema notation file with the client.

2. The system of claim 1, wherein the aggregated common schema notation file represents a JavaScript Object Notation (JSON) merge of the most recent common schema notation file for each delta table in the range.

3. The system of claim 1, wherein the aggregating is performed in response to a write or delete operation that alters a state of the common schema notation file in the delta table in the range.

4. The system of claim 3, wherein the aggregating is triggered asynchronously.

5. The system of claim 1, wherein the aggregated common schema notation file contains an aggregation timestamp and wherein the operations further comprise recovering consis-tency of the aggregated common schema notation file using the aggregation timestamp.

6. The system of claim 1, wherein the first piece of metadata is used to train a machine learning model.

7. The system of claim 1, wherein the sharing is per-formed via a delta sharing application program interface (API).

8. A method comprising:

generating a first piece of metadata for a delta table in a data lake, the data lake being a storage containing structured, unstructured, and semi-structured data, the delta table describing differences among multiple ver-sions of a data like file stored in the data lake, the first piece of metadata being of a first metadata type that is not supported by a format of the delta table;

storing the first piece of metadata in a common schema notation file, the common schema notation file having a format that is used for defining and documenting structure of data models;

binding the common schema notation file to the delta table, wherein the binding comprises attaching the common schema notation file to the delta table;

receiving a request from a client for a share of a range of delta tables, the range comprising the delta table;

aggregating a most recent common schema notation file for each delta table in the range into an aggregated common schema notation file separate and distinct from a delta table; and sharing the aggregated common schema notation file with the client.

9. The method of claim 8, wherein the aggregated common schema notation file represents a JavaScript Object Notation (JSON) merge of the most recent common schema notation file for each delta table in the range.

10. The method of claim 8, wherein the aggregating is performed in response to a write or delete operation that alters a state of a common schema notation file in a delta table in the range.

11. The method of claim 10, wherein the aggregating is triggered asynchronously.

12. The method of claim 8, wherein the aggregated common schema notation file contains an aggregation timestamp and wherein the method further comprises recovering consistency of the aggregated common schema notation file using the aggregation timestamp.

13. The method of claim 8, wherein the first piece of metadata is used to train a machine learning model.

14. The method of claim 8, wherein the sharing is performed via a delta sharing application program interface (API).

15. A non-transitory machine-readable medium storing instructions which, when executed by one or more processors, cause the one or more processors to perform operations comprising:

generating a first piece of metadata for a delta table in a data lake, the data lake being a storage containing structured, unstructured, and semi-structured data, the delta table describing differences among multiple versions of a data like file stored in the data lake, the first piece of metadata being of a first metadata type that is not supported by a format of the delta table;

storing the first piece of metadata in a common schema notation file, the common schema notation file having a format that is used for defining and documenting structure of data models;

binding the common schema notation file to the delta table, wherein the binding comprises attaching the common schema notation file to the delta table;

receiving a request from a client for a share of a range of delta tables, the range comprising the delta table;

aggregating a most recent common schema notation file for each delta table in the range into an aggregated common schema notation file separate and distinct from a delta table; and sharing the aggregated common schema notation file with the client.

16. The non-transitory machine-readable medium of claim 15, wherein the aggregated common schema notation file represents a JavaScript Object Notation (JSON) merge of the most recent common schema notation file for each delta table in the range.

17. The non-transitory machine-readable medium of claim 15, wherein the aggregating is performed in response to a write or delete operation that alters a state of the common schema notation file in the delta table in the range.

18. The non-transitory machine-readable medium of claim 17, wherein the aggregating is triggered asynchronously.

19. The non-transitory machine-readable medium of claim 15, wherein the aggregated common schema notation file contains an aggregation timestamp and wherein the operations further comprise recovering consistency of the aggregated common schema notation file using the aggregation timestamp.

20. The non-transitory machine-readable medium of claim 15, wherein the first piece of metadata is used to train a machine learning model.

* * * * *